United States Patent
Han (10) Patent No.: US 6,611,841 B1
(45) Date of Patent: Aug. 26, 2003

(54) KNOWLEDGE ACQUISITION AND RETRIEVAL APPARATUS AND METHOD

(75) Inventor: Sherwin Han, Portsmouth, RI (US)

(73) Assignee: Abstract Productions, Inc., Portsmouth, RI (US)

( * ) Notice: Subject to any disclaimer, the term of this patent is extended or adjusted under 35 U.S.C. 154(b) by 0 days.

(21) Appl. No.: 09/541,247

(22) Filed: Apr. 3, 2000

Related U.S. Application Data (60) Provisional application No. 60/127,764, filed on Apr. 2, 1999.

(51) Int. Cl.7 ............................................... G06F 17/00
(52) U.S. Cl. .............................. 707/102; 707/1; 707/2; 707/100; 707/101; 706/46; 706/61
(58) Field of Search ........................ 707/1–10, 100–103; 706/45–46, 61

(56) References Cited

U.S. PATENT DOCUMENTS

| | | | | |
|---|---|---|---|---|
| 5,555,408 A | * | 9/1996 | Fujisawa et al. | 707/5 |
| 5,560,006 A | * | 9/1996 | Layden et al. | 707/2 |
| 5,768,578 A | | 6/1998 | Kirk et al. | |
| 5,787,234 A | | 7/1998 | Molloy | |
| 5,809,493 A | * | 9/1998 | Ahamed et al. | 706/52 |
| 6,014,665 A | | 1/2000 | Culliss | |
| 6,038,560 A | | 3/2000 | Wical | |
| 6,038,668 A | | 3/2000 | Chipman et al. | |

\* cited by examiner

*Primary Examiner*—Kim Vu
*Assistant Examiner*—Joon Hwan Hwang
(74) *Attorney, Agent, or Firm*—Kevin A. Oliver; Foley Hoag LLP (57) ABSTRACT

A knowledge acquisition and retrieval apparatus and method that emulate the human brain and comprise at least one first memory segment, and a distinct second memory segment, wherein elements of the at least one first memory segment are reciprocally associated to elements of the second memory segment, and vice-versa. The at least one first memory segment comprises categorized data from the physical world, known as representational data, while the second memory segment contains abstract or conceptual data, otherwise known as consciousness data. Physical data comprises auditory data, language data, visual data, motion data, and sensory data, and each element of the at least one first memory segment is identified as auditory data, language data, visual data, motion data, or sensory data. By reciprocally associating the physical (representational) and conceptual (consciousness) data, a hierarchical structure is created that allows information retrieval by traversing the reciprocal associations. Varying retrieval algorithms traverse the hierarchical structure differently to generate specified system outputs. Retrieval algorithms are implemented to represent human information retrieval functions commonly known as reduction, imaging, deduction, recognition, recall, categorization, and reasoning.

35 Claims, 7 Drawing Sheets

RETRIEVAL ALGORITHMS

| | |
|---|---|
| REDUCTION | C < L |
| IMAGING | C>A, C>V, C>M, C>S |
| DEDUCTION | L < C |
| RECOGNITION | A<C, V<C, M<C, S<C |
| RECALL | C > L |
| CATEGORIZATION | R > C |
| REASONING | R1---R2 < C1 ^ CN ^ C2 |

WHERE:

R = REPRESENTATIONAL, OR PHYSICAL DATA OF ANY KIND;
C = CONSCIOUSNESS, OR CONCEPTUAL DATA;
L = LANGUAGE REPRESENTATIONAL/PHYSICAL DATA;
A = AUDITORY REPRESENTATIONAL/PHYSICAL DATA;
V = VISUAL REPRESENTATIONAL/PHYSICAL DATA;
M = MOTION REPRESENTATIONAL/PHYSICAL DATA;
S = SENSORY REPRESENTATIONAL/PHYSICAL DATA;
R1, R2 ARE REPRESENTATIONAL ELEMENTS, AND C1, C2 ARE RESPECTIVE, CORRESPONDING CONCEPTUAL ELEMENTS; AND CN REPRESENTS MULTIPLE, UNKNOWN CONCEPTUAL ELEMENTS;

AND,

< = SINGLE INPUT, POTENTIAL MULTIPLE OUTPUT;
> = MULTIPLE INPUT, POTENTIAL MULTIPLE OUTPUT; and,
^ = INTERSECTION.

KNOWLEDGE ACQUISITION AND RETRIEVAL APPARATUS AND METHOD

This application claims the benefit of Provisional application Ser. No. 60/127,764, filed Apr. 2, 1999.

BACKGROUND OF THE INVENTION

(1) Field of the Invention

The present invention relates generally to information storage and retrieval, and more particularly to knowledge-based information storage and retrieval.

(2) Description of the Prior Art

A computer does not store, process, or retrieve information in the same manner as the human brain. In nearly all instances, the human knowledge processing system is more efficient than existing computer processing algorithms. Research and concepts including neural networks, fuzzy logic, etc., attempt to simulate the human brain's vast capability to learn and associate in complex manners. U.S. Pat. No. 5,761,496 to Hattori presents an information retrieval system that retrieves information on a trial and error basis based upon a keyword input by the user and previously stored background information. Alternately, U.S. Pat. No. 6,026,393 to Gupta et al. presents a system and method to reduce the cases applicable to a current problem in a case-based reasoning system. U.S. Pat. No. 6,038,560 to Wical discloses a concept knowledge base search and retrieval system wherein document theme vectors allow a query system to produce terminology that identifies the potential existence of documents for the queried subject matter. Such existing systems are useful for retrieving a particular class or category of data, where the data is of one particular species. These systems implement rule-based solutions as opposed to structure-based solutions that are constructed in the human brain. This is a severe limitation for continued progress in robotics and artificial intelligence.

The human brain's associative capabilities are not limited like a computer to words or pure binary data stimuli. The human brain makes associations based upon visual data, auditory data, sensory data such as touch, and motion data, all of which emanate from the physical world. The human brain therefore stores, associates, and can recall multiple data species with a single object. For example, the brain may associate "banana" with the category of fruit, the spoken word banana, the image of a ripe yellow banana, the image of a non-ripe green banana, the smell of a banana, the texture of a banana peel, etc.

There is not currently a knowledge acquisition and retrieval apparatus or method that provides human-like storage, relationship, and retrieval for a multitude of data classes and species.

What is needed is an apparatus and method that simulates the human brain's capacity to learn, relate, and recall relationships and associations for a multitude of different categories and data species.

SUMMARY OF THE INVENTION

The present invention provides an apparatus and method to organize, transform, and associate information between two conceptually graduated memory stages. For the acquisition stage, the invention provides an input system allowing presentation of multiple format data to the memory. As data is acquired, the memory stages build and maintain reciprocal associations. Such reciprocal associations allow cooperative processing between the memory stages to form a hierarchical association between related elements. This hierarchical association is exploited during the data retrieval process. Data retrieval may occur using as many as seven different retrieval algorithms that emulate the human cognitive functions.

Other objects and advantages of the present invention will become more obvious hereinafter in the specification and drawings.

These objects are accomplished with the present invention by a knowledge acquisition and retrieval apparatus and method that emulate the human brain and comprise at least one first memory segment, and a distinct second memory segment, wherein elements of the at least one first memory segment are reciprocally associated to elements of the second memory segment, and vice-versa. The at least one first memory segment comprises categorized data from the physical world, known as representational data, while the second memory segment contains abstract or conceptual data, otherwise known as consciousness data. Physical data comprises auditory data, language data, visual data, motion data, and sensory data, and each element of the at least one first memory segment is identified as auditory data, language data, visual data, motion data, or sensory data. By reciprocally associating the physical (representational) and conceptual (consciousness) data, a hierarchical structure is created that allows information retrieval by traversing the reciprocal associations. Varying retrieval algorithms traverse the hierarchical structure differently to generate specified system outputs. Retrieval algorithms are implemented to represent human information retrieval functions commonly known as reduction, imaging, deduction, recognition, recall, categorization, and reasoning.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DESCRIPTION OF THE PREFERRED EMBODIMENT

To provide an overall understanding of the invention, certain illustrative embodiments will now be described; however, it will be understood by one of ordinary skill in the art that the systems described herein can be adapted and modified to provide systems for other suitable applications and that other additions and modifications can be made to the invention without departing from the scope hereof.

Figure 1:
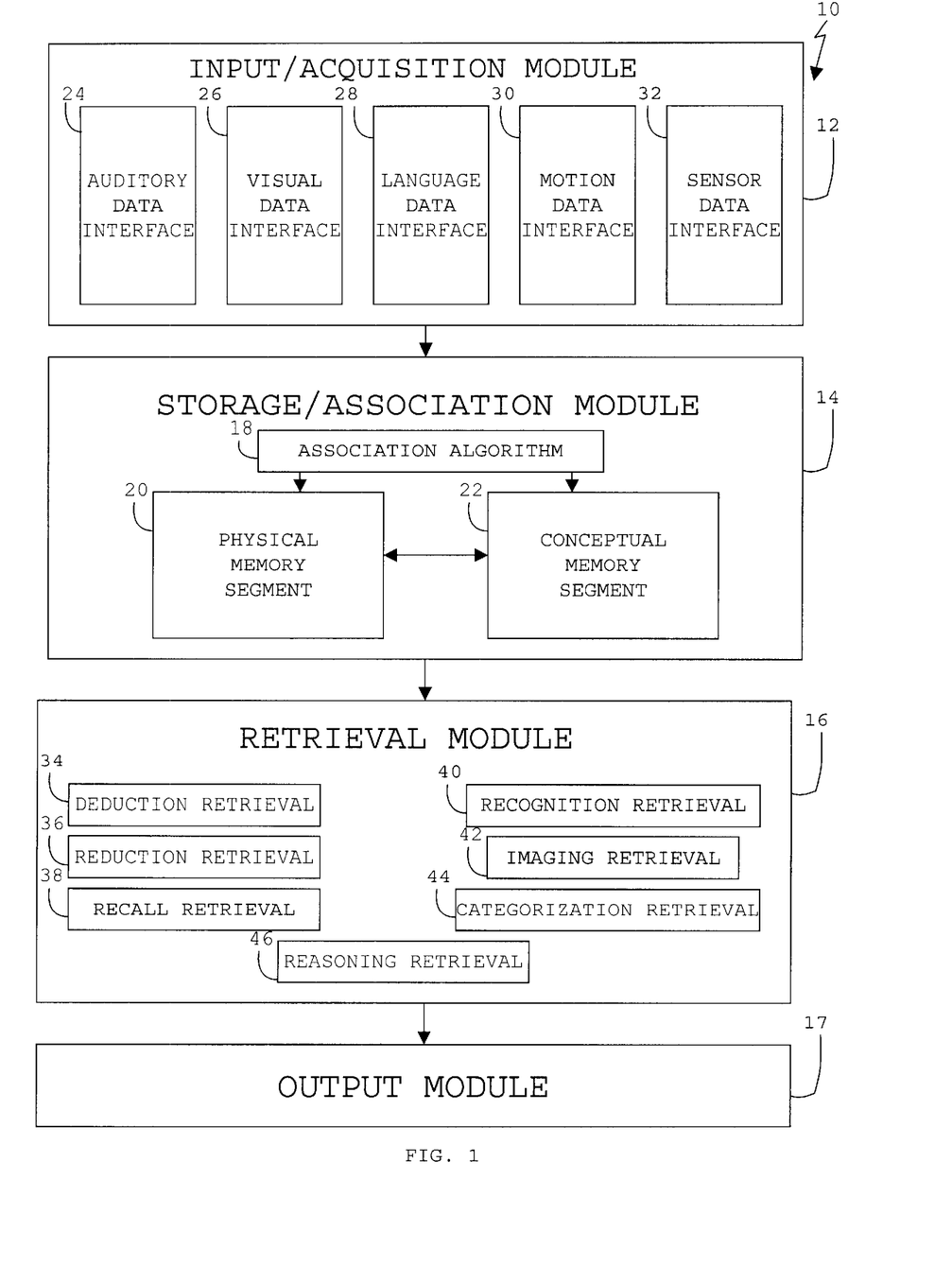
FIG. 1 diagrammatically presents the basic structural knowledge acquisition and retrieval system.

FIG. 1 represents one embodiment of the knowledge acquisition and retrieval system 10 that incorporates the principles of the invention. Such a system can be implemented using a digital computer system and information sources that are accessible via a communication network, keyboard, digital camera, microphone, etc. The digital computer system can be any microprocessor-based system including a computer workstation, such as a PC workstation or a SUN workstation, that comprises a program for organizing and controlling the digital computer system to operate as the system according to the invention. Additionally and optionally, the microprocessor-based system can be equipped for processing multimedia data, and can be, for example, a conventional PC computer system with a sound and video card. The computer system can operate as a stand-alone system or as part of a networked computer system. Alternatively, the computer systems can be dedicated devices, such as embedded systems, that can be incorporated into existing hardware devices, such as telephone systems, PBX systems, sound cards, etc. Accordingly, it will be understood by one of ordinary skill in the art that the systems and methods described herein have wide applicability and can be incorporated in many systems, and realized in many forms, all without departing from the scope of the invention.

Referring to FIG. 1, the knowledge acquisition and retrieval system 10 shall be described by referring to four basic structural components that are presented merely for explanatory purposes, and are not intended to represent a limitation of the invention herein: An input/acquisition module 12, a storage/association module 14, a retrieval module 16, and an output module 17. Because the storage/association module 14 dictates the input/acquisition module 12 and retrieval module 16 components, the storage/association module 14 shall be described first.

As shown by FIG. 1, the storage/association module 14 is comprised of an association algorithm 18, and two memory segments designated the physical memory segment 20, and the conceptual memory segment 22. The association algorithm interfaces between the input/acquisition module 12 and the two memory segments 20, 22 to ensure that all outputs of the input/acquisition module 12 resolve into reciprocally associated physical and conceptual memory elements.

The storage/association module 14 contains two memory segments 20, 22 to emulate the human brain storage mechanism. The human brain contains two memories that shall be referred to herein as representational memory and consciousness memory. Representational information is information received directly by the senses from the physical world. Alternately, consciousness information is not received directly from the senses, but is rather generated from representational information and may be viewed as a property of representational information or a shared group of representational information. Consciousness data is abstract data, and is retained at a higher level of categorization than the representational data received from the physical world. For simplicity, the remainder of this specification shall refer to representational data as physical data, and consciousness data as conceptual data. Correspondingly, FIG. 1 indicates the physical memory segment 20 for storing physical data, and the conceptual memory segment 22 for storing conceptual data.

The association algorithm 18 ensures that each physical memory element is reciprocally associated to at least one conceptual memory element. Because the physical and conceptual memory segments 20, 22 are reciprocally associated, they may be constructed from a single memory that is divided into two segments, or two physically separate memory segments. Similarly the reciprocal associations can be established through any linking device including pointers and/or linked lists, but the invention is not so limited. In the preferred embodiment, the memory is constructed upon a database system, such as Microsoft Access, ODBC, or SQL Server.

In the preferred embodiment, the input/acquisition module 12 is a multi-modality input system that simulates the human senses. Referring to FIG. 1, the input/acquisition module 12 contains interfaces to accept auditory data 24 including sounds input by a microphone, visual data 26 including graphs and images, language data 28 including written, spoken, scanned, and FAXed text, motion data 30 including positional information from sonar, radar, etc., and sensor data 32 that may be from any electronic measuring device including sonar, radar, temperature sensors, medical devices, etc.

Each of the multi-modal input interfaces requires the user to identify that data comprising the physical data, and that data comprising the conceptual data. For example, auditory information may be input through a microphone to record a baby crying. The sound is the physical data, while "baby crying" is the abstract or conceptual data. A picture of Abraham Lincoln may be scanned through the visual data interface as physical data, with "Abraham Lincoln" associated as the conceptual data. Language data may be input through any interface, for example a graphical user interface (GUI) that prompts for physical and conceptual data pairs, e.g., "George Washington"-"president" may be entered as the physical-conceptual pair. Positional data received from radar is representative of physical data from the motion data interface 30, while the corresponding conceptual data would be "current position". Similarly, a temperature reading from a thermometer may be introduced through the sensor data interface 32 as physical data, with the associated conceptual data being "temperature".

The association algorithm 18 within the storage/association module 14 is responsible for accepting the physical-conceptual data pairings from the multi-modal input/acquisition module 12, transferring the data to the respective physical and conceptual memory segments, 20, 22, and ensuring reciprocal associations between the newly entered data elements. A further function of the association algorithm 18 is to ensure that the physical data is properly identified as auditory, visual, language, motion, or sensory.

In the preferred embodiment, to further emulate the human brain, the physical data memory segment 20 is further divided into multiple partitions, with each partition corresponding to a respective input mode or data type. As shown by FIG. 1, because there are five different modal inputs (e.g., auditory, visual, language, motion, and sensor), the physical memory segment 20 maintains five partitions, thereby organizing the information received by each modal input. Alternately, conceptual memory 22 is not partitioned.

Figure 2A:
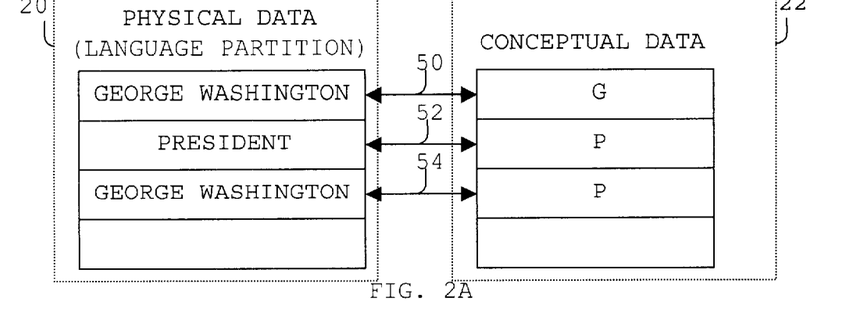
FIG. 2 presents an example of the reciprocal association algorithm.

Referring now to FIG. 2A, there is shown an example of the physical and conceptual memory segments after language data is input through the language data interface. In the preferred embodiment, the language data interface comprises a GUI that prompts a user for physical data and its associated conceptual data. In the example provided, "George Washington-President" is entered as the physical-conceptual data pair. From this data pair, the system "learns" the relationship between the physical and conceptual elements by associating the physical and conceptual data elements as shown by FIG. 2A. For simplicity, FIG. 2A represents only the language partition of the physical data memory 20.

Upon receiving the data pair "George Washington-President", the association algorithm 18 seeks to establish three reciprocal associations between the physical and conceptual memory segments. In this instance, the language partition of the physical data segment is utilized because the data is from the language data interface. The first association is established using the rule that every physical data element is reciprocally associated to a conceptual data element. In FIG. 2A, "George Washington" is reciprocally associated 50 to the abstract concept "G". The second reciprocal association is established by the rule that every conceptual data element is reciprocally associated to a physical data element. In FIG. 2A, this reciprocal association is demonstrated by "president" (physical data) reciprocally associating 52 to the abstract concept "P". The third reciprocal association is established by the data pairing itself, and shown in FIG. 2A as 54. The physical (language partition) data of "George Washington" is reciprocally associated 54 to the abstract concept of "P", wherein P is shown by 52 to be the abstract concept relating to the physical data of president. The three reciprocal connections 50, 52, 54 complete the learning process for the example input.

Figure 2B:
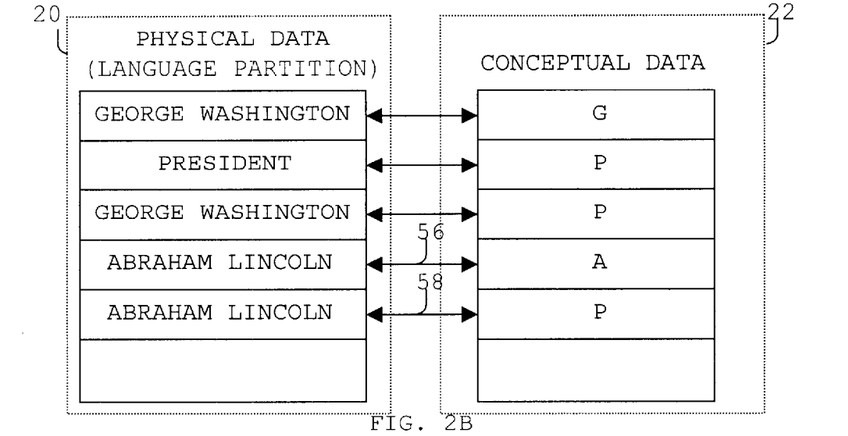

Continuing the example, consider that additional language lie, information is input similarly as "Abraham Lincoln-President". Referring now to FIG. 2B, there is shown the physical and conceptual memory segments 20, 22 with pre-existing reciprocal associations from FIG. 2A, and new reciprocal associations indicated. The association algorithm first establishes a reciprocal association 56 between "Abraham Lincoln" in the physical memory segment (language partition) and an abstract concept A in conceptual memory 20. Secondly, the association algorithm seeks to establish an association between the conceptual element P and president; however, this relationship has already been learned, and therefore it is not necessary to "learn" this concept again by entering the relationship. Thirdly, a reciprocal association is established between the physical data of "Abraham Lincoln" and the conceptual data P 58, wherein P is the conceptual element relating to the physical data known as "President".

Figure 2C:
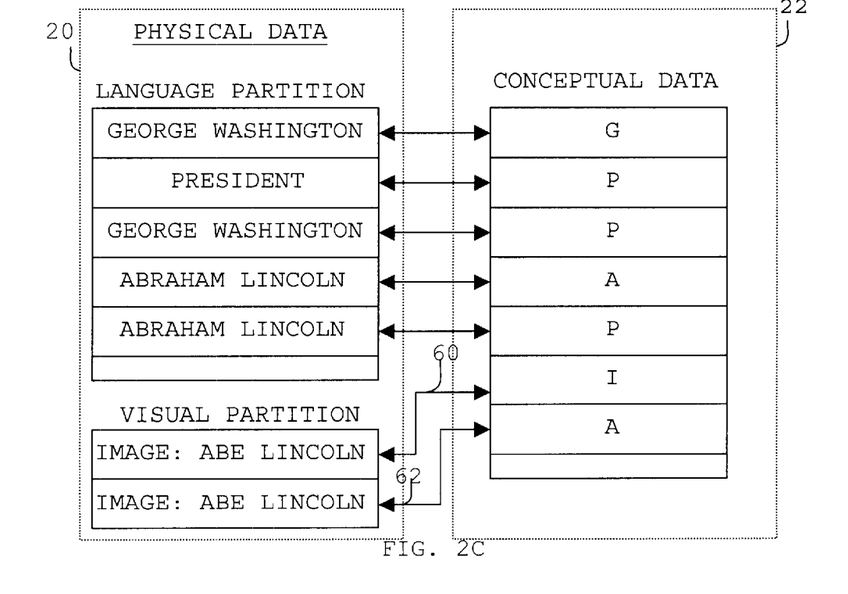

As a third step in the input/acquisition process, consider a visual input comprising an image of Abraham Lincoln. The physical data is the image, while the conceptual data is "Abraham Lincoln." Referring now to FIG. 2C, there is shown pre-existing reciprocal associations from FIG. 2B, with additional reciprocal associations established. The association algorithm will place the image in the visual data partition of physical memory 20, and establish the reciprocal associations. First, a reciprocal association 60 is established between the physical data image and a conceptual data element. Secondly, a reciprocal association between the concept "Abraham Lincoln" and a physical data element is sought, and determined to be already established, or learned. Thirdly, the physical data image is reciprocally associated to the abstract concept representing Abraham Lincoln 62.

Although the example provided was limited to language and visual data, as already noted, the invention is not so limited, additionally allowing auditory, motion, and sensor data, with similar partitions of the physical memory segment. Similarly, although the invention is capable of auditory, motion, visual, sensor, and language inputs, it is not necessary to include all input modes to embody the invention. The number of associations created is only limited by the memory segment size (if physical data is partitioned into segments, partition sizes must also be considered.)

Referring back to FIG. 1, the third major component of the knowledge acquisition and retrieval system 10 is the retrieval module 16. The retrieval module 16 is primarily responsible for emulating the human brain's cognitive capabilities by retrieving data from physical memory and outputting the data to a desired format or medium for the multi-modal output module 17. Because the physical data is divided into auditory, visual, language, motion, and sensor partitions, with each partition representative of the data stored therein, the potential system outputs are correspondingly auditory, visual, language, motion, and sensor data. Auditory data may be output to a speaker, visual and language data may be output to document, screen, GUI, or other computer readable medium, and motion and sensor data may be output to another device, instrument, GUI, document, etc. The output module 17, similar to the input/acquisition module 12, is also multi-modal, and comprises interfaces to the various output devices.

The retrieval module 16 comprises a set of algorithms that traverse reciprocal associations between the physical memory segment 20 and the conceptual memory segment 22 according to a designated retrieval method. Because the knowledge acquisition and retrieval system 10 emulates the human brain, all outputs must be extracted from physical memory 20, whose elements represent the physical world. In the retrieval process, conceptual memory 22 is accessed merely to derive associations to physical memory elements.

In the preferred embodiment, the retrieval module 16 comprises seven retrieval algorithms that are selectable through a GUI. Depending upon the selected retrieval algorithm, the GUI prompts the user for inputs. The seven retrieval algorithms simulate human brain retrieval processes, and are defined as deduction 34, reduction 36, recall 38, recognition 40, imaging 42, categorization 44, and reasoning 46.

Figure 3:
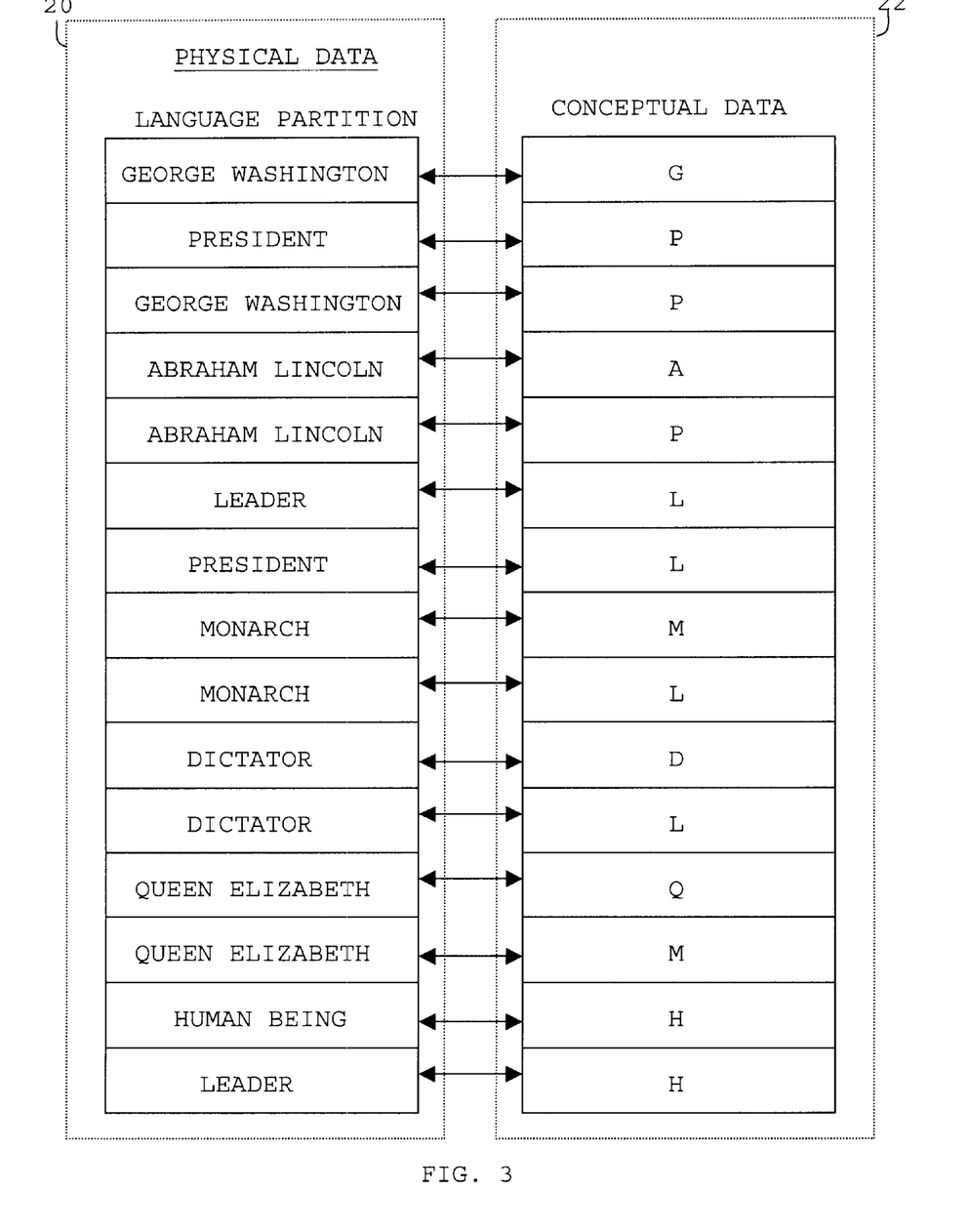
FIG. 3 is a sample, reciprocally associated database containing a physical data segment and a conceptual data segment.

Deduction 34 is a retrieval algorithm to extract exclusively from the language partition of physical data memory. Deduction is defined as the set of conceptual data related to a physical data element, wherein the physical data element is categorized as language data, and the related conceptual data is associated to language data. Referring now to FIG. 3, there is shown a database representing the language partition of physical data memory 20, and conceptual data memory 22, with established reciprocal associations as indicated. A deduction retrieval request for the user-specified physical data element "George Washington" presents the set of conceptual data associated to "George Washington". Using the example database of FIG. 3, a search through physical data memory for all conceptual data associated to "George Washington" provides conceptual data "G" and "P". Once again, the retrieval algorithm cannot generate abstract ideas, but must generate the corresponding physical world equivalents. Since "G" reciprocates to "George Washington", or the input data, it is not provided as an output; however, "P" reciprocates to "President", which comprises physical world data different from the input. The deductive output for "George Washington" is therefore "President". This process is considered a linear retrieval from conceptual data (consciousness data), wherein the input is physical, language data, and the output is also language data associated with the retrieved conceptual data. Because there is only one input yet potential multiple outputs, this process is hereby defined as a single-input process. This retrieval may be mathematically expressed as L<C, where L signifies the input Language data, <indicates a single input producing potentially multiple outputs, and C signifies the retrieved conceptual data.

Recognition retrieval 40 is the same retrieval algorithm as deduction, except whereas deduction is limited to a single, language physical data input, recognition retrieval 40 accepts as input a single, physical data input from any physical data category other than the language type (i.e., auditory, visual, motion, or sensor), and outputs the conceptual data related to the input. Depending upon the input category, this retrieval may be mathematically expressed as A<C, V<C, M<C, S<C, where A signifies auditory data input, V signifies visual data input, M signifies motion data input, and S signifies sensor data input. Once again, as in deduction, there are potential multiple outputs for recognition.

Reduction retrieval 36, like deduction retrieval 34, is limited to retrieving physical data from the language partition. Reduction retrieval generates the set of (language) physical data that is related to a specified conceptual idea (input). Referring again to the sample database of FIG. 3, if "Leader" is presented as the conceptual element, "Leader" is conceptually represented as "L". A search through conceptual memory for all physical data associated to "L" (other than the input, "Leader") provides "President", "Monarch", and "Dictator", which comprise the output of a reduction inquiry with "Leader" as the input. In reduction, there is exactly one input, yet potential multiple outputs. Mathematically, this may be represented as C<L, where C signifies the single conceptual data input, <signifies a single input and potential multiple outputs, and L signifies the Language data output(s).

Figure 4A:
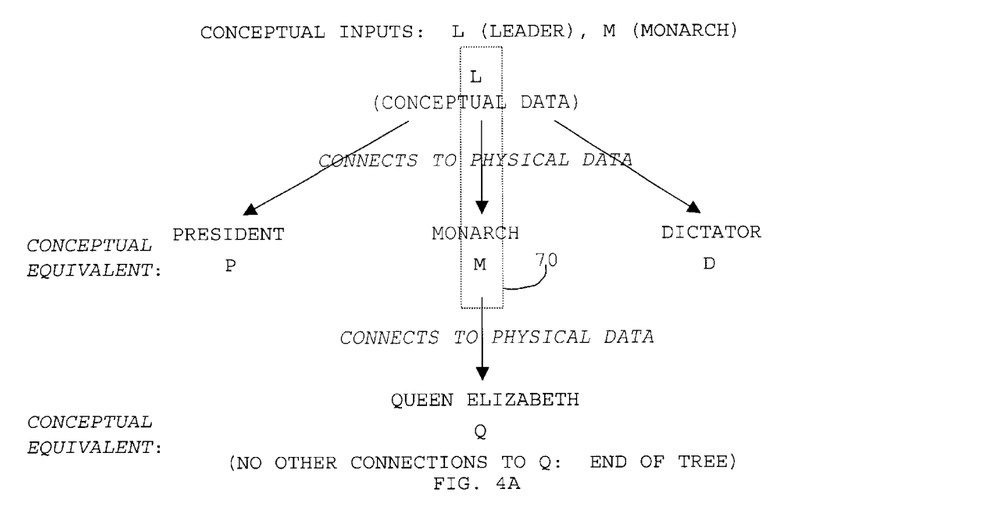
FIG. 4 diagrammatically presents a hierarchical structure as viewed by retrieval algorithms.

Recall retrieval 38 is an algorithm performing the same procedure as reduction, except recall requires two or more conceptual data inputs. Recall provides as output those physical data elements identified as language data, that represent the physical data common to the two or more conceptual data inputs. Referring to the sample database of FIG. 3, consider two inputs of "Leader" and "Monarch" as the conceptual elements, corresponding to "L" and "M" respectively. Referring now to FIG. 4A, there is shown the tree diagram representing the recall retrieval algorithm. A search through conceptual data for "L" provides reciprocal associations with "President", "Monarch", and "Dictator", otherwise conceptually represented as "P", "M", and "D", respectively. Because the connection containing "L" and "M" is the desired connection and it is already established, it is now only necessary to pursue the reciprocal associations of the common branch 70. A search through the FIG. 3 database conceptual data for the conceptual data "M" provides a single reciprocal association to "Queen Elizabeth". A similar search in conceptual data for "Q", the conceptual equivalent of "Queen Elizabeth", does not provide any reciprocal associations, thereby ending the recall retrieval algorithm. The single recall algorithm output for this example is therefore "Queen Elizabeth"; however, if multiple monarchs were listed, the recall retrieval would have produced multiple outputs. This recall function operates in the same manner as the human brain to recall information having specified common properties. Mathematically, recall retrieval may be expressed as C>L, where C signifies conceptual data, >indicates multiple inputs with potential multiple outputs, and L signifies language, physical data. An alternate mathematical representation for recall with two inputs may be C1+C2>L1 ^L2, where C1 is the first conceptual input, C2 is the second conceptual input, L1 is the language physical data associated with C1, L2 is the language physical data associated with C2, and ^ denotes intersection.

Imaging retrieval 42 is the same retrieval process as recall retrieval 36, however whereas recall 36 is limited to retrieving from the language partition of the physical memory segment, imaging 42 is limited to retrieving from the auditory, visual, motion, and sensor partitions of physical memory 20. Imaging may be mathematically represented as C>A, C>V, C>M, and C>S, where C signifies the multiple conceptual data inputs, >represents multiple inputs, and A signifies potential multiple auditory outputs, V signifies potential multiple visual outputs, M signifies potential multiple motion outputs, and S signifies potential multiple sensor outputs. Alternately, imaging for two inputs may be represented as C1+C2>R1 ^ R2, where C1 and C2 are the conceptual inputs, R1 and R2 are the respective, non-language representational (physical) data, and ^ denotes intersection.

Figure 4B:
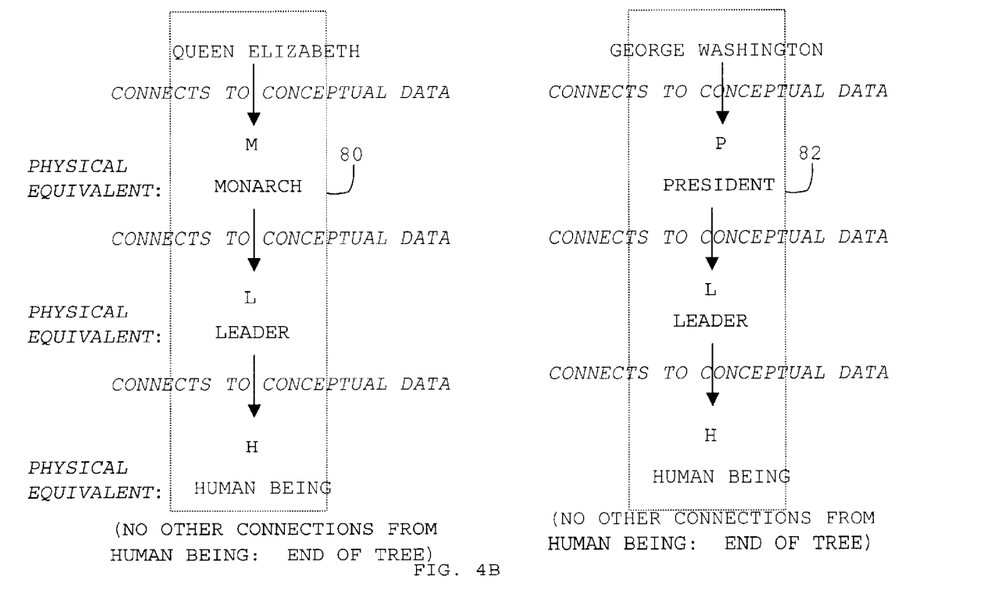

Categorization retrieval 44 requires two or more inputs representing physical data inputs. Categorization retrieval produces those conceptual data elements that the two physical data inputs share. As an example using the database from FIG. 3, consider inputs of "Queen Elizabeth" and "George Washington". Conceptually, categorization produces a tree for each physical data input, and produces as output the common elements, or intersection, of the respective trees. FIG. 4B illustrates the trees produced for the respective physical data inputs. Using the FIG. 3 sample database, a search for "Queen Elizabeth" in physical data presents reciprocal associations to M conceptually. M is physically represented as Monarch, and a search for "Monarch" in physical data produces reciprocal associations to conceptual data L. Continuing, a search of physical data for "Leader" (corresponding to L) provides reciprocal associations with H, or "Human Being". A search of "Human Being" in physical data does not reciprocally associate with any other concept, thereby ending the tree 80. A similarly constructed tree may be produced by performing the same analysis using the FIG. 3 sample database, but beginning with "George Washington" 82, and repeatedly searching the physical data memory for reciprocal associations. The categorization output is the intersection of the trees for "Queen Elizabeth" 80 and "George Washington" 82, thereby producing an output of "Leader" and "Human Being". Much like the human mind, categorization retrieval generates the common elements, i.e., Queen Elizabeth and George Washington both were leaders and human beings. Mathematically, categorization may be represented as R>C, where R signifies representational data (i.e., any physical data), > represents multiple inputs and potential multiple outputs, and C signifies the potential, multiple conceptual data outputs. An alternate mathematical representation for two inputs is R1+R2>C1 ^C2, where R1 and R2 are the physical (representational) data inputs, C1 and C2 are the corresponding conceptual data, and A denotes intersection.

Referring back to FIG. 1, reasoning retrieval 46 accepts two or more elements from physical data as input, and generates an output equivalent to those conceptual data elements that connect the reasoning inputs through deduction. For example, referring to the sample FIG. 3 database, consider as input "George Washington" and "Leader". "George Washington" connects conceptually to "P", or "President", and "President" connects to "L", or "Leader". The reasoning retrieval output for the present example is therefore "President" as the conceptual ("P") connection between the two terms. Again, the human mind, when presented with "George Washington" and "Leader", would reason that George Washington was a leader because he was a President.

Mathematically, reasoning may be represented as R1—R2<C1 ^Cn ^C2, where R1 and R2 are the physical (representational) data input pair, C1 and C2 are the respective conceptual data elements, Cn represents all conceptual data elements connecting C1 and C2, and ^ denotes intersection.

Figure 5:
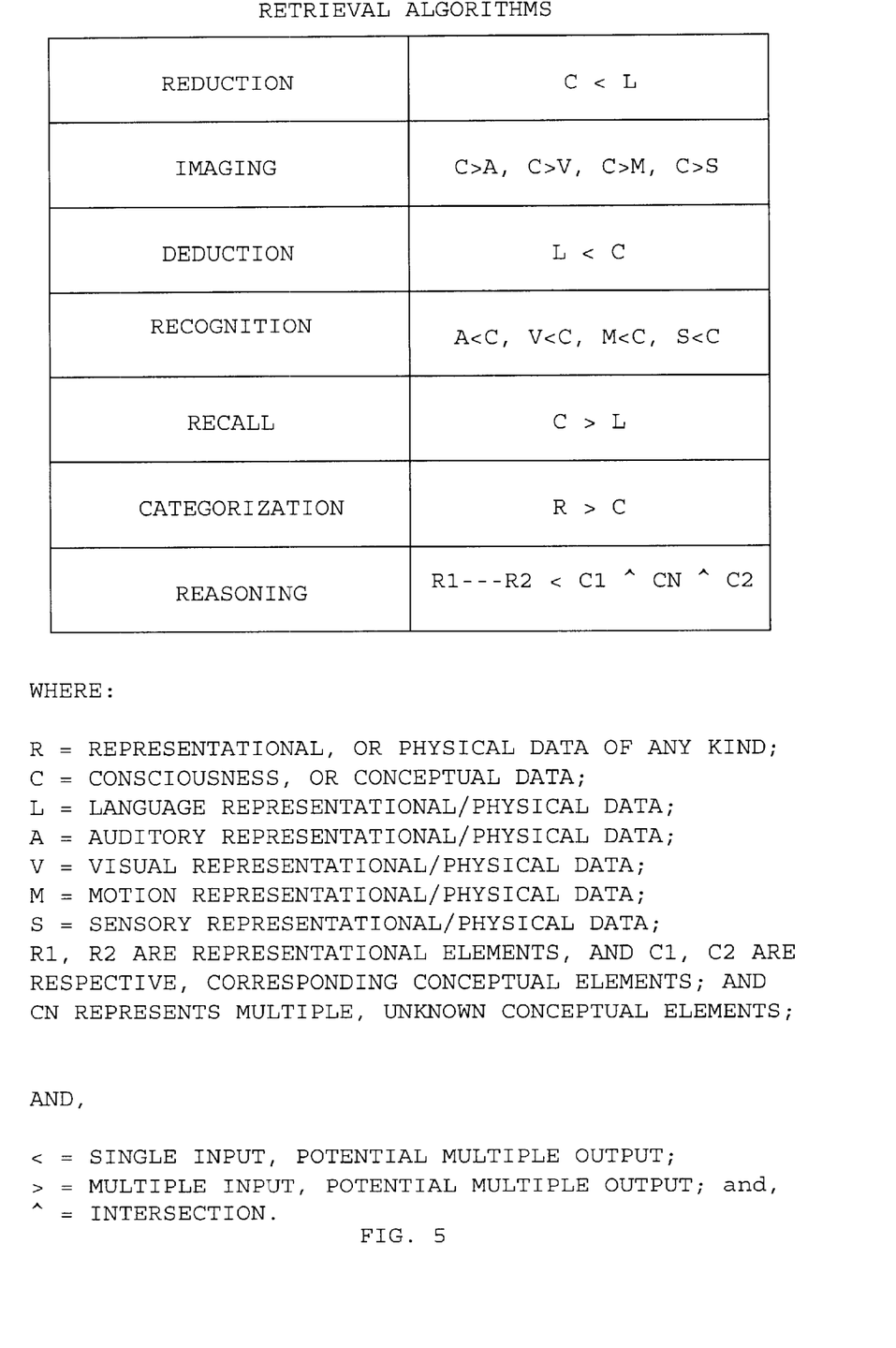
FIG. 5 displays the retrieval algorithms of the preferred embodiment, and their mathematical representations as described herein.

Referring now to FIG. 5, there is shown a summary of the seven retrieval algorithms with their corresponding mathematical representations as provided herein.

Figure 6:
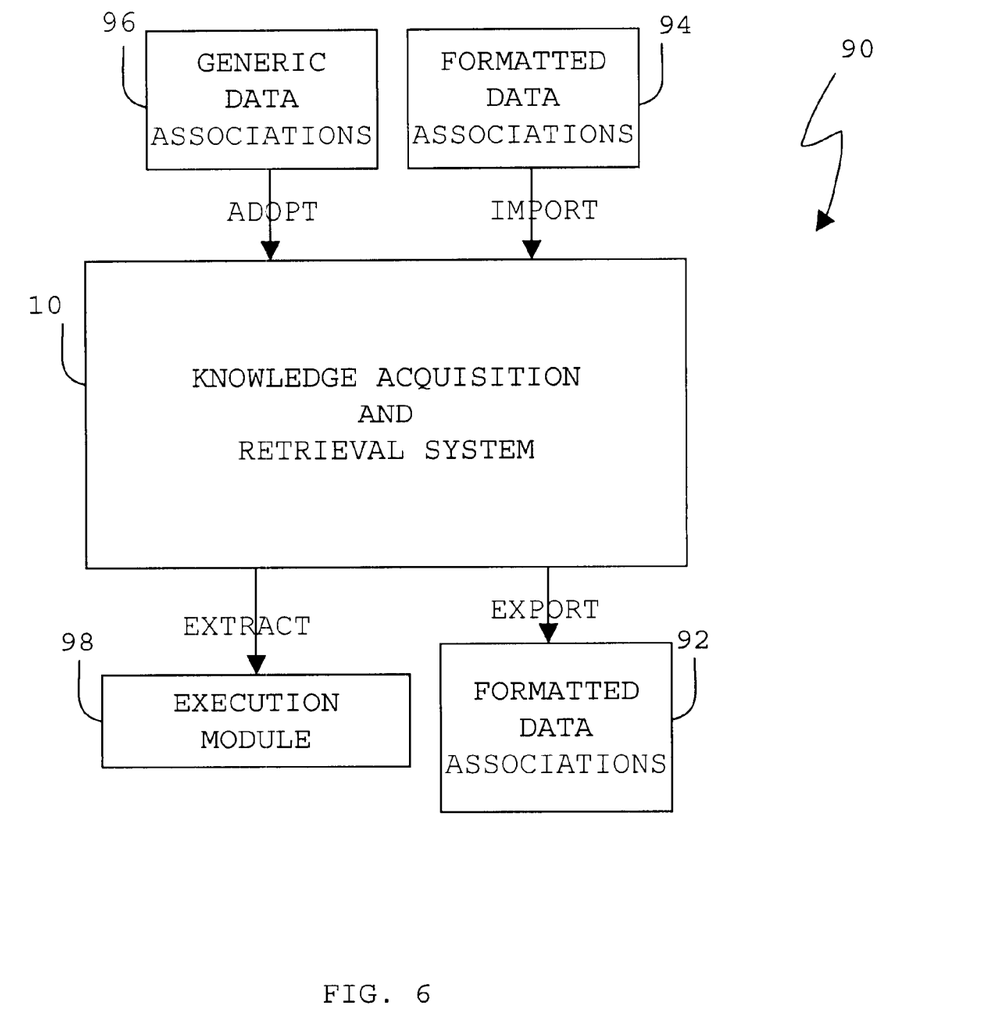
FIG. 6 depicts the external systems and functionality that may be imported or exported from the knowledge acquisition and retrieval system; and, FIG. 7 provides a block diagram of an execution module that extracts data from the knowledge acquisition and retrieval system.

Referring now to FIG. 6, there is shown the knowledge acquisition and retrieval system 10 to illustrate additional capabilities regarding interaction with other systems. Although the present invention provides multi-modality input and output systems for auditory, language, visual, motion, and sensor data, the system 10 also allows mechanisms for data export, data import, and data adoption.

Data export is a function whereby the physical and conceptual memories, and the reciprocal associations established therein, are written in a formatted manner to an external device 92. Such external device may be a data file, other computer system connected through a network, or any computer readable in medium. These formatted data associations 92 may then be imported by another system practicing the invention presented herein. The import of the formatted database 94 does not require any conversion as the formatted database comprises the required reciprocal associations. Data import from a formatted database is a direct operation from the external database, to the physical and conceptual memory segments.

Alternately, generic databases 96 may provide data for input to the reciprocally associated physical and conceptual memories; however, because traditional databases do not provide the reciprocal associations required by the invention herein, the generic data must be reformatted to provide reciprocal association for entry into the physical and conceptual memory segments. This process is known as adoption. In the preferred embodiment, the knowledge acquisition and retrieval system 10 provides a GUI that allows selection of specific, generic databases that may be adapted to the reciprocal memory. Examples of such specific databases that can be adopted include SQL, ODBC, dBase, and Oracle, but the invention herein is not so limited, and the adoption algorithm may be adapted to include any generic database. Each generic database for adoption may require a different conversion algorithm.

In the preferred embodiment, the knowledge acquisition and retrieval system GUI provides an interface to allow selection of data export, data import, and data adoption.

Figure 7:
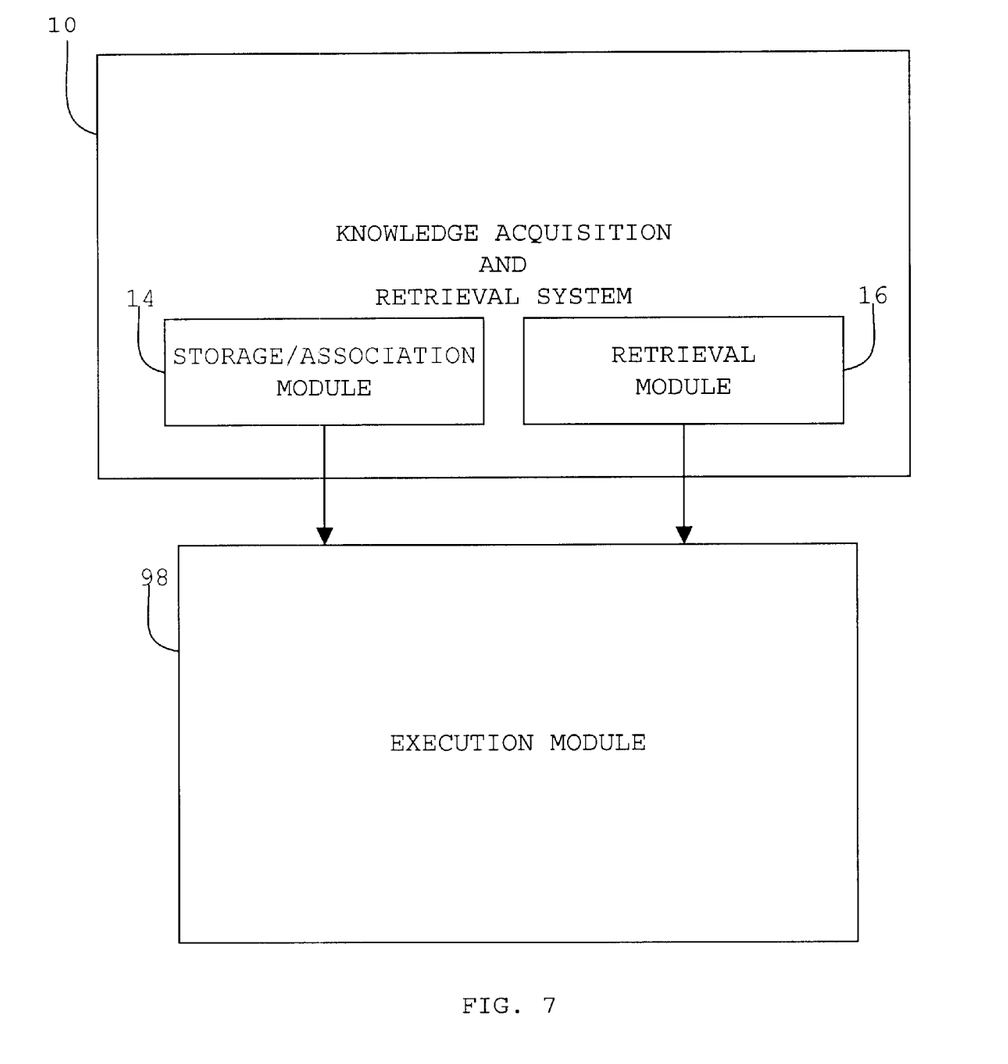

Referring again to FIG. 6, there is shown the execution module 98 that receives or extracts data from the knowledge acquisition and retrieval system 10. Referring now to FIG. 7, the execution module 10 extracts physical and conceptual data information with corresponding reciprocal associations, to form new memory associations. The execution module 98 typically extracts only a data subset from the knowledge acquisition and retrieval system 10 for the specific purpose of deriving relationships corresponding to executable functions such as walking, jumping, throwing, catching, etc. The execution module 98 may extract information directly from the storage/association module 14 (i.e., physical and conceptual memory directly), or the execution module 98 may extract data indirectly through the retrieval module 16 and its retrieval algorithms. The execution module 98 therefore comprises an interface to extract data subsets from the physical and conceptual memory segments, a dual memory configuration to store the extracted data and maintain the reciprocal associations, an association or learning algorithm to further associate the extracted concepts and relate them to an activity, and an output interface to output the activity data to the desired output device or sensor.

What has thus been described is a knowledge acquisition and retrieval apparatus and method that emulate the human brain and comprise at least one first memory segment, and a distinct second memory segment, wherein elements of the at least one first memory segment are reciprocally associated to elements of the second memory segment, and vice-versa. The at least one first memory segment comprises categorized data from the physical world, known as representational data, while the second memory segment contains abstract or conceptual data, otherwise known as consciousness data. Physical data comprises auditory data, language data, visual data, motion data, and sensory data, and each element of the at least one first memory segment is identified as auditory data, language data, visual data, motion data, or sensory data. By reciprocally associating the physical (representational) and conceptual (consciousness) data, a hierarchical structure is created that allows information retrieval by traversing the reciprocal associations. Varying retrieval algorithms traverse the hierarchical structure differently to generate specified system outputs. Retrieval algorithms are implemented to represent human information retrieval functions commonly known as reduction, imaging, deduction, recognition, recall, categorization, and reasoning.

Although the present invention has been described relative to a specific embodiment thereof, it is not so limited. Obviously many modifications and variations of the present invention may become apparent in light of the above teachings. It will be understood that although the systems have been described with reference to functional blocks, the systems described herein can be computer programs, such as C language or Java language programs, and that the blocks depicted herein are merely representative of the procedures and functions that can be performed by the program. It will further be understood that the systems can be dedicated hardware devices, or combinations of hardware and software. For example, although the examples provided indicated three reciprocal database associations for each physical-conceptual input pairing, multiple-valued pointers may be implemented to effectuate the three relationships using fewer than three database entries. A database structure is not required, and the system may be built upon different memory segments. Additionally, the physical memory segment may comprise a single memory device with multiple partitions, or multiple memory devices, or combinations thereof. The conceptual memory segment may be similarly structured. Although the system provided for auditory, visual, language, motion, and sensor inputs and outputs, only one or a subset of such input/output devices may be utilized. Similarly, the input and output interfaces for the different input or output modes may be shared, separate, and may require multiple interfaces for a single input or output mode. Although the system was structure as having input, storage/association, retrieval, and output modules, the modules are not required to be structured as such, and functionality may be incorporated otherwise. The preferred embodiment presented seven different retrieval algorithms, but the invention may be practiced with fewer than seven retrieval algorithms.

Many additional changes in the details, materials, steps and arrangement of parts, herein described and illustrated to explain the nature of the invention, may be made by those skilled in the art within the principle and scope of the invention. Accordingly, it will be understood that the invention is not to be limited to the embodiments disclosed herein and may be practiced otherwise than specifically described, but is to be understood from the following claims, which are to be interpreted as broadly as allowed under the law.

What is claimed is:

1. A knowledge acquisition and retrieval system, comprising:

at least one first memory segment;

a distinct second memory segment, wherein elements of the distinct second memory segment are reciprocally associated with elements of the at least one first memory segment, wherein such reciprocal associations further comprise:

a hierarchical relationship between elements of the at least one first memory segment by traversing the reciprocal associations;

a hierarchical relationship between elements of the distinct second memory segment by traversing the reciprocal association; and, an associative algorithm, wherein the associative algorithm further comprising:

a first input;

a distinct second input;

a first association module to search the at least one first memory segment for the first input, and exit upon finding the first input in the at least one first memory segment, and otherwise stores the first input in the at least one first memory segment, creates a corresponding first abstract element in the distinct second memory segment, and reciprocally associates the at least one first memory segment element containing the first input, with the distinct second memory segment element containing the first abstract element;

a second association module to search the at least one first memory segment for the distinct second input, and exit upon finding the distinct second input in the at least one first memory segment, and otherwise stores the distinct second input in the at least one first memory segment, creates a corresponding second abstract element in the distinct second memory segment, and reciprocally associates the at least one first memory segment element containing the second input, with the distinct second memory segment element containing the second abstract element; and, a third association module to reciprocally associate the at least one first memory segment element containing the first input, with the distinct second memory segment element containing the second abstract element.

2. The system of claim 1, further comprising at least one retrieval algorithm to retrieve data from the at least one first memory segment.

3. The system of claim 1, further comprising at least one of:

a deduction retrieval algorithm, a recognition retrieval algorithm, a reduction retrieval algorithm, an imaging retrieval algorithm, a recall retrieval algorithm, a categorization retrieval algorithm, and a reasoning retrieval algorithm.

4. The system of claim 1, further comprising:

a deduction retrieval module, the deduction retrieval module comprising:

a deduction input, wherein the deduction input comprises an element identified as language data of the at least one first memory segment; and, at least one deduction output representing at least one element identified as language data of the at least one first memory segment, the at least one deduction output corresponding to the distinct second memory segment elements reciprocally associated with the deduction input and different from the deduction input.

5. The system of claim 1, further comprising at least one of:

an export module to transfer elements of the at least one first memory segment and reciprocally associated elements of the distinct second memory segment, to a computer readable medium;

an import module to read from a computer readable medium, elements compatible with the at least one first memory segment, the distinct second memory segment, and the reciprocal associations therein, and transfer the compatible elements to the at least one first memory segment and the distinct second memory segment; and, an adoption module to read a database and convert the database to the at least one first memory segment and the distinct second memory segment, and create the reciprocal associations.

6. The system of claim 1, further comprising an execution module, the execution module further comprising:

an execution input module to accept data from the at least one first memory segment and the distinct second memory segment;

an execution storage module to store data from the at least one first memory segment and the distinct second memory segment;

an execution association algorithm to generate relationships between data in the execution storage module and generate an action information; and, an execution output module to output the action information.

7. The system of claim 1, further comprising:

at least one input interface to accept at least one of: auditory data, visual data, language data, motion data, and sensor data; and, at least one output interface to provide at least one of: auditory data, visual data, language data, motion data, and sensor data.

8. The system of claim 7, wherein:

auditory data comprises sound data, further comprising data compatible with a microphone;

language data comprises words from written, typed, scanned, FAXed, or computer readable medium, and a graphical user interface;

visual data comprises pictorial data, further comprising graphical data and image data;

motion data comprises data compatible with a motion sensor, farther comprising radar data, sonar data, and other positional information data; and, sensor data comprises data compatible with a sensor device, further comprising data received from an electronic measurement device.

9. The system of claim 1, wherein the at least one first memory segment and the distinct second memory segment further comprise a database.

10. The system of claim 1, wherein the at least one first memory segment further comprises at least one of:

a first, first memory segment to exclusively store auditory data;

a distinct second, first memory segment to exclusively store visual data;

a distinct third, first memory segment to exclusively store language data;

a distinct fourth, first memory segment to exclusively store motion data; and, a distinct fifth, first memory segment to exclusively store sensory data.

11. The system of claim 1, further comprising a recognition retrieval algorithm, the recognition retrieval algorithm comprising:

a recognition input, wherein the recognition input comprises at least one first memory segment element identified as visual data, auditory data, sensor data, or motion data; and, at least one recognition output representing at least one element of the at least one first memory data segment, and corresponding to at least one distinct second memory segment element:

reciprocally associated with the recognition input, and, different from the recognition input.

12. The system of claim 1, further comprising a reduction retrieval algorithm, the reduction retrieval algorithm comprising:

a reduction input, wherein the reduction input comprises an element of the distinct second memory segment; and, at least one reduction output representing at least one first memory segment element identified as language data and corresponding to at least one first memory segment element reciprocally associated with the reduction input.

13. The system of claim 1, further comprising an imaging retrieval algorithm, the imaging retrieval algorithm comprising:

at least one imaging input, the at least one imaging input comprising at least one element of the distinct second memory segment; and, at least one imaging output representing at least one first memory segment element identified as auditory data, motion data, sensory data, or visual data and corresponding to at least one first memory segment element reciprocally associated with all of the at least one imaging input.

14. The system of claim 1, further comprising a recall retrieval algorithm, the recall retrieval algorithm comprising:

at least two recall inputs, the at least two recall inputs comprising at least two elements of the distinct second memory segment; and, at least one recall output representing at least one first memory segment element identified as language data of at least one first memory segment reciprocally associated with all of the at least two recall inputs.

15. The system of claim 1, further comprising a categorization retrieval algorithm, the categorization retrieval algorithm comprising:

at least two categorization inputs, the at least two categorization inputs comprising at least least two first memory segment elements; and, at least one categorization output representing at least one element of the distinct second memory segment reciprocally associated with all of the at least two categorization inputs.

16. The system of claim 1, further comprising a reasoning retrieval algorithm, the reasoning retrieval algorithm comprising:

a first reasoning input, the first reasoning input comprising a first memory segment element;

a distinct second reasoning input, the distinct second reasoning input comprising a first memory segment element; and, at least one reasoning output representing all elements of the at least one first memory segment that are traversed in the reciprocally associated hierarchy connecting the first reasoning input and the distinct second reasoning input.

17. A knowledge acquisition and retrieval method, comprising:

designating at least one first memory segment;

designating a distinct second memory segment; and, reciprocally associating elements of the distinct second memory segment with elements of the at least one first memory segment, to create a hierarchical relationship between elements of the at least one first memory segment by traversing the reciprocal associations, and to create a hierarchical relationship between elements of the distinct second memory segment by traversing the reciprocal associations, the reciprocal associations formed by an associative module that accepts a first input and a distinct second input, and, searches the at least one first memory segment for the first input, and exits upon finding the first input in the at least one first memory segment, and otherwise stores the first input in the at least one first memory segment, creates a corresponding first abstract element in the distinct second memory segment, and reciprocally associates the at least one first memory segment element containing the first input, with the distinct second memory segment element containing the first abstract element;

searches the at least one first memory segment for the distinct second input, and exits upon finding the distinct second input in the at least one first memory segment, and otherwise stores the distinct second input in the at least one first memory segment, creates a corresponding second abstract element in the distinct second memory segment, and reciprocally associates the at least one first memory segment element containing the second input, with the distinct second memory segment element containing the second abstract element; and, reciprocally associates the at least one first memory segment element containing the first input, with the distinct second memory segment element containing the second abstract element.

18. The method of claim 17, further comprising retrieving data from the at least one first memory segment.

19. The method of claim 17, further comprising retrieving data from the at least one first memory segment using at least one of a deduction retrieval algorithm, a recognition retrieval algorithm, a reduction retrieval algorithm, an imaging retrieval algorithm, a recall retrieval algorithm, a categorization retrieval algorithm, and a reasoning retrieval algorithm.

20. The method of claim 17, further comprising retrieving data from the at least one first memory segment based on a executing a deduction retrieval algorithm:

where executing the deduction retrieval algorithm further comprises:

obtaining a deduction input, wherein the deduction input comprises an element identified as language data of the at least one first memory segment; and, generating at least one deduction output representing at least one element identified as language data of the at least one first memory segment, the at least one deduction output corresponding to the distinct second memory segment elements reciprocally associated with the deduction input and different from the deduction input.

21. The method of claim 17, further comprising at least one of:

exporting data by transferring elements of the at least one first memory segment and reciprocally associated elements of the distinct second memory segment, to a computer readable medium;

importing data from a computer readable medium, elements compatible with the at least one first memory segment, the distinct second memory segment, and the reciprocal associations therein, and transferring the compatible elements to the at least one first memory segment and the distinct second memory segment; and, adopting data from a database and converting the database to the at least one first memory segment and the distinct second memory segment, and creating the reciprocal associations.

22. The method of claim 17, further comprising developing an execution module, developing an execution module further comprising:

designing an execution input module to accept data from the at least one first memory segment and the distinct second memory segment;

designing an execution storage module to store data from the at least one first memory segment and the distinct second memory segment;

creating an execution association algorithm to generate relationships between data in the execution storage module and generate an action information; and, designing an execution output module to output the action information.

23. The method of claim 17, further comprising at least one of:

providing at least one input interface for accepting at least one of auditory data, visual data, language data, motion data, and sensory data; and, providing at least one output interface for providing at least one of: auditory data, visual data, language data, motion data, and sensory data.

24. The method of claim 23, wherein:

accepting auditory data comprises accepting sound data, further comprising accepting data compatible with a microphone;

accepting language data comprises accepting words for written, typed, scanned, FAXed, or computer readable medium, and a graphical user interface;

accepting visual data comprises accepting pictorial data, further comprising accepting graphical data and image data;

accepting motion data comprises accepting data compatible with a motion sensor, further comprising accepting radar data, sonar data, and other positional information data;

accepting sensor data comprises accepting data compatible with a sensor device, further comprising accepting data received from any electronic measurement device;

providing auditory data comprises providing sound data, further comprising providing data compatible with a microphone;

providing language data comprises providing words for written, typed, scanned, FAXed, or computer readable medium, and a graphical user interface;

providing visual data comprises providing pictorial data, further comprising providing graphical data and image data;

providing motion data comprises providing data compatible with a motion sensor further comprising providing radar data, sonar data, and other positional information data; and, providing sensor data comprises providing data compatible with a sensor device, further comprising providing data received from any electronic measurement device.

25. The method of claim 17, further comprising developing a database from the at least one first memory segment and the distinct second memory segment.

26. The method of claim 17, further comprising executing at least one retrieval algorithm to retrieve data from the at least one first memory segment.

27. The method of claim 17, further comprising:

obtaining a first input, the first input comprising auditory data, language data, visual data, motion data, or sensory data;

obtaining a distinct second input, the second input comprising auditory data, language data, visual data, motion data, or sensory data;

providing at least one input interface for accepting auditory data, visual data, language data, motion data, and sensor data; and, providing at least one output interface for providing auditory data, visual data, language data, motion data, and sensor data.

28. The method of claim 27, wherein:

accepting auditory data comprises accepting sound data, further comprising accepting data compatible with a microphone;

accepting language data comprises accepting words for written, typed, scanned, FAXed, or computer readable medium, and a graphical user interface;

accepting visual data comprises accepting pictorial data, further comprising accepting graphical data and image data;

accepting motion data comprises accepting data compatible with a motion sensor, further comprising accepting radar data, sonar data, and other positional information data;

accepting sensor data comprises accepting data compatible with a sensor device, further comprising accepting data received from any electronic measurement device;

providing auditory data comprises providing sound data, further comprising providing data compatible with a microphone;

providing language data comprises providing words for written, typed, scanned, FAXed, or computer readable medium, and a graphical user interface;

providing visual data comprises providing pictorial data, flirter comprising providing graphical data and image data;

providing motion data comprises providing data compatible with a motion sensor, further comprising providing radar data, sonar data, and other positional information data; and, providing sensor data comprises providing data compatible with a sensor device, further comprising providing data received from any electronic measurement device.

29. The method of claim 17, wherein designating at least one first memory segment further comprises at least one of:

designating a first, first memory segment to exclusively store auditory data;

designating a distinct second, first memory segment to exclusively store visual data;

designating a distinct third, first memory segment to exclusively store language data;

designating a distinct fourth, first memory segment to exclusively store motion data; and, designating a distinct fifth, first memory segment to exclusively store sensory data.

30. The method of claim 17, further comprising retrieving data from the at least one first memory segment based on a executing a recognition retrieval algorithm, where executing the recognition retrieval algorithm comprises:

obtaining a recognition input, the recognition input comprising an at least one first memory segment element identified as visual data, auditory data, sensor data, or motion data; and, generating at least one recognition output representing at least one first memory data segment element that corresponds to the distinct second memory segment elements reciprocally associated with the recognition input and different from the recognition input.

31. The method of claim 17, further comprising retrieving data from the at least one first memory segment based on a executing a reduction retrieval algorithm, where executing the reduction retrieval algorithm comprises:

obtaining a reduction input, the reduction input comprising a distinct second memory segment element; and, generating at least one reduction output representing at least one element identified as language data of the at least one first memory segment, the at least one reduction output corresponding to the at least one first memory segment element reciprocally associated with the reduction input.

32. The method of claim 17, further comprising retrieving data from the at least one first memory segment based on a executing an imaging retrieval algorithm, where executing the imaging retrieval algorithm comprises:

obtaining at least one imaging input, the at least one imaging input comprising at least one element of the distinct second memory segment; and, generating at least one imaging output representing at least one element of the at least one first memory segment identified as auditory data, motion data, sensory data, or visual data, that corresponds to the at least one first memory segment element reciprocally associated with all of the at least one imaging input.

33. The method of claim 17, further comprising retrieving data from the at least one first memory segment based on a executing a recall retrieval algorithm, where executing the recall retrieval algorithm comprises:

obtaining at least two recall inputs, wherein the at least two recall inputs comprise at least two elements of the distinct second memory segment; and, generating at least one recall output representing the at least one element identified as language data of the at least one first memory segment reciprocally associated with all of the at least two recall inputs.

34. The method of claim 17, further comprising retrieving data from the at least one first memory segment based on a executing a categorization retrieval algorithm, where executing the categorization retrieval algorithm comprises:

obtaining at least two categorization inputs, wherein the at least two categorization inputs comprise at least two elements of the at least one first memory segment; and, generating at least one categorization output representing the at least one element of the distinct second memory segment reciprocally associated with all of the at least two categorization inputs.

35. The method of claim 17, further comprising retrieving data from the at least one first memory segment based on a executing a reasoning retrieval algorithm, where executing the reasoning retrieval algorithm comprises:

obtaining a first reasoning input, wherein the first reasoning input comprises an element of the at least one first memory segment;

obtaining a distinct second reasoning input, wherein the distinct second reasoning input comprises an element of the at least one first memory segment; and, generating at least one reasoning output representing all elements of the at least one first memory segment that are traversed in the reciprocally associated hierarchy connecting the first reasoning input and the distinct second reasoning input.

\* \* \* \* \*